April 1, 1958   F. K. H. NALLINGER   2,828,694
WINDSHIELD WASHING DEVICES FOR MOTOR VEHICLES
Filed April 20, 1954   3 Sheets-Sheet 1

April 1, 1958  F. K. H. NALLINGER  2,828,694
WINDSHIELD WASHING DEVICES FOR MOTOR VEHICLES
Filed April 20, 1954  3 Sheets-Sheet 2

United States Patent Office 2,828,694
Patented Apr. 1, 1958

2,828,694

WINDSHIELD WASHING DEVICES FOR MOTOR VEHICLES

Friedrich K. H. Nallinger, Stuttgart, Germany, assignor to Daimler-Benz Aktiengesellschaft, Stuttgart-Unterturkheim, Germany Application April 20, 1954, Serial No. 424,473

Claims priority, application Germany April 24, 1953

14 Claims. (Cl. 103—52)

The present invention relates generally to devices for washing the windshields of motor vehicles, and is particularly directed to pumping devices for discharging a cleaning fluid against the windshields of the kind wherein the pumping device is driven by a suction actuated motor connected to the intake manifold of an associated automobile engine or some other suitable source of vacuum or low pressure.

Previously known windshield washing devices of the described character have had the disadvantage of operating only during those periods when a relatively low pressure exists in the intake manifold of the engine, so that, during acceleration of the motor vehicle, for example, in overtaking or passing another vehicle on the road, the window washing device is incapable of proper operation.

Accordingly, it is an object of the present invention to provide a windshield washing device of the described character including a suction operated pump which is constructed and arranged to be capable of spraying the cleaning fluid against the windshield even when no suction or low pressure is available in the intake manifold of the associated motor vehicle.

A further object is to provide a windshield washing device of the described character including a suction operated pump which is capable of accumulating or storing energy during the existence of a low pressure in the intake manifold of the engine so that such energy is available to operate the pump when it is desired to spray the cleaning fluid against the windshield during acceleration of the vehicle, or whenever else the pressure within the intake manifold may not be low enough to operate the cleaning fluid pump.

In accordance with the invention, the foregoing objects, and other objects, features and advantages thereof appearing in the following detailed description are achieved by providing a windshield washing device which includes a pump for the cleaning fluid having a cylinder with a piston arranged for reciprocation within the latter, a spring within the pump cylinder at one side of the related piston to resist movement of the latter in one direction, and a valve arrangement associated with the pump cylinder to alternately communicate the cylinder, at said one side of the piston, either with a source of vacuum or low pressure, for example, the intake manifold of the engine of the associated motor vehicle, or with a source of relatively high pressure, for example, the atmosphere. Thus, when the source of vacuum is connected with the pump cylinder, the piston is moved against the spring to compress the latter and store energy therein, and further, in accordance with the invention, an arrangement is provided for preventing the return movement of the piston by the spring until such time as it is desired to operate the windshield washing device. Another feature resides in the provision of a valve arrangement which is actuated by the pump piston so that, after the latter has been moved against the related spring to store energy in the spring, the valve arrangement is shifted to interrupt the communication between the source of vacuum and the interior of the pump cylinder and to place the interior of the pump cylinder in communication with the atmosphere. On the other hand, the cooperation between the pump piston and the valve arrangement is such that, at the conclusion of the pumping stroke of the pump piston for effecting the spraying of the cleaning fluid against the windshield, the pump piston automatically switches the valve arrangement to the disposition whereby communication is established between the source of vacuum and the pump cylinder to again move the pump piston against the spring.

In accordance with a further feature of the invention, an arrangement is provided whereby movement of the pump piston in the direction for storing energy in the related spring may be effected manually so that conditioning of the windshield washing device for subsequent operation is not dependent upon the existence of low pressure of vacuum within the intake manifold of the associated engine whereby the windshield washing device can be operated without starting the engine.

In order that the present invention may be clearly understood, illustrative embodiments thereof are hereinafter described in detail, merely by way of example, and shown in the accompanying drawings, wherein.

Figure 1:
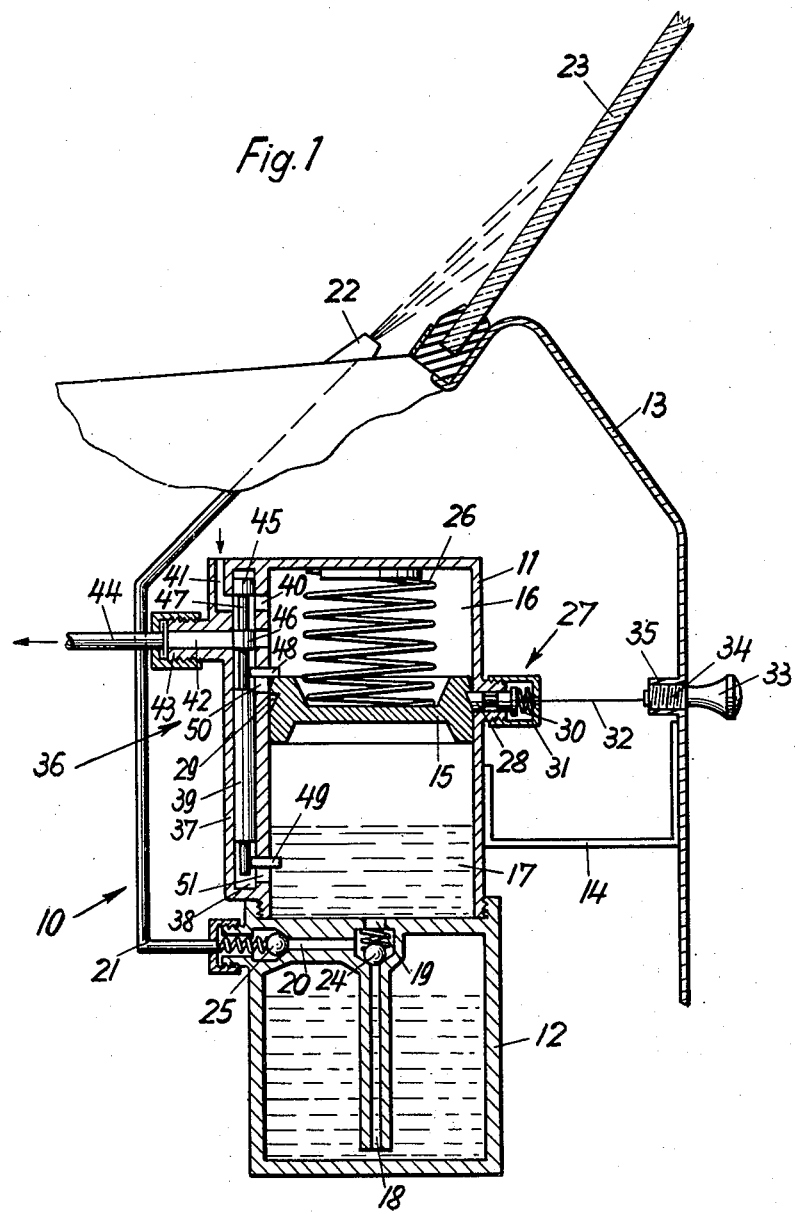
Fig. 1 is a vertical sectional view of a windshield washing device embodying the present invention.

Referring to the drawings in detail, and initially to Fig. 1 thereof, a windshield washing device embodying the present invention is there illustrated and generally identified by the reference numeral 10. Device 10 includes a pump cylinder 11 having a tank 12 depending therefrom to contain the cleaning fluid. The assembly of the pump cylinder 11 and tank 12 is adapted to be supported in back of the dashboard 13 of the motor vehicle, for example, by suitable brackets 14. A piston 15 is disposed within cylinder 11 and is free to reciprocate with respect to the latter so that two chambers 16 and 17 of oppositely varying volumes are defined within cylinder 11 above and below, respectively, the piston 15.

A cleaning fluid feed pipe 18 depends from the bottom of cylinder 11 into tank 12 and opens through a passage 19 into the lower chamber 17 of the pump cylinder, which forms a pumping chamber, and through a lateral passage 20, which serves for the discharge of the cleaning fluid, into a discharge pipe 21 leading to a spraying nozzle 22 mounted in front of the windshield 23 to direct a spray of cleaning fluid against the latter. Suitable check valves 24 and 25 are disposed in feed pipe 18 and lateral passage 20, respectively, with the valve 24 opening during upward movement of piston 15 and closing during downward movement of the latter, while valve 25 opens during downward movement of piston 15 and closes during upward movement of the latter.

A compression spring 26, which may be helical as shown in the drawing, is interposed between piston 15 and the top end wall of cylinder 11 to resist upward movement of the piston and so that the spring 26 acts to store-up or accumulate energy when it is compressed by upward movement of the piston.

A latch device, generally identified by the reference numeral 27, is provided on cylinder 11 to releasably retain piston 15 in an upwardly displaced position, shown in Fig. 1, against the downward force exerted by compressed spring 26. The latch device 27 may include a latch 28 projecting radially into cylinder 11 to engage in a suitable circumferential groove 29 formed in the outer surface of piston 15, with the latch 28 being urged radially inward into groove 29 by a spring 30 interposed between the outer enlarged end of latch 28 and a latch housing 31 carried by cylinder 11. In order to provide for manual withdrawal of latch 28 from groove 29, thereby to release piston 15 for downward movement, a cable 32 extends from the latch to an actuating knob 33 located upon the dashboard 13 of the motor vehicle. The knob 33 is arranged to exert a longitudinal pull upon cable 32 when it is desired to remove latch 28 from engagement with groove 29 of the piston 15. As shown in Fig. 1, knob 33 may be provided with a threaded stem 34 engaging in a threaded socket 35 on the dashboard so that, when knob 33 is rotated, the knob is axially displaced for exerting the desired longitudinal pull on cable 32.

Windshield washing device 10 further includes a valve assembly generally identified by the reference numeral 36, and operative to alternatively establish communication of the upper or driving chamber 16 of the cylinder with either the atmosphere or a source of low pressure or vacuum, for example, as exists within the intake manifold of an automobile engine. Valve assembly 36 is made up of a valve housing 37, preferably extending along cylinder 11 and defining an elongated internal space 38 within which a slide valve member 39 is longitudinally movable. Valve housing 37 is provided with a first passage 40 which laterally intersects space 38 and opens, at its opposite ends, to the atmosphere, as at 41, and into the upper chamber 16 of cylinder 11. Valve housing 37 is further provided with a second passage 42, also laterally intersecting space 38, but at a location spaced from passage 40 in the longitudinal direction of the cylinder, and passage 42 opens, at its opposite ends, through a suitable nipple 43 for connection to a conduit or pipe 44 leading to a source of low pressure or vacuum and into the upper chamber 16 of cylinder 11.

Valve member 39 is formed, adjacent its upper end, with two axially spaced apart, diametrically enlarged portions 45 and 46 fitting closely in space 38 and separated by a relatively narrow portion 47, with the enlarged portions 45 and 46 being disposed so that, when the valve member is at the upper limit of its travel within space 38, portion 46 closes passage 42 and portion 45 is above passage 40 as shown in Fig. 1, to establish communication between upper chamber 16 of the cylinder 11 and the atmosphere through passage 40 and around narrow portion 47 of the valve member. On the other hand, when the valve member 39 is at the lower limit of its travel, enlarged portion 45 of the valve member closes passage 40, while enlarged portion 46 of the valve member is then disposed below passage 42 to establish communication between chamber 16 and pipe 44, leading to the source of low pressure or vacuum, through passage 42 and around the narrow portion 47 of the valve member.

Movement of the valve member 39 between the upper and lower limits of its travel is automatically effected, for example, by displacement of piston 15, and, for this purpose, valve member 39 is provided with lateral extensions 48 and 49 projecting through suitable longitudinal slots 50 and 51, respectively, into the chambers 16 and 17 above and below, respectively, piston 15. The extensions 48 and 49 are arranged so that, as piston 15 moves upwardly toward its raised position, where it is retained by the latch device 27, extension 48 is engaged by the upper surface of piston 15 to raise the valve member 39 during the final increment of upward movement of the piston, thereby to displace valve member 39 to the position shown in Fig. 1, wherein upper chamber 16 of cylinder 11 is in communication with the atmosphere. Similarly, the lower extension 49 is arranged so that, as piston 15 approaches the bottom of cylinder 11 during its downward movement under the influence of spring 26, the lower surface of piston 15 engages extension 49 and pushes the latter downwardly before it to displace valve member 39 to its position (not shown) wherein upper chamber 16 of the cylinder is placed in communication with the source of low pressure or vacuum in the manner previously described.

The above described embodiment of the invention operates as follows:

Following the discharge of cleaning fluid by the windshield washing device 10, piston 15 is in its lowered position, and valve member 39 is accordingly disposed to communicate chamber 16 with the source of low pressure or vacuum, for example, the intake manifold of an associated automobile engine. The relatively low pressure existing in chamber 16 results in upward movement of piston 15, and such upward movement of the piston serves to draw cleaning fluid from tank 12 past check valve 24 into the lower chamber 17 of the pump cylinder. When piston 15 reaches its raised position (Fig. 1) latch 28 engages in groove 29 of the piston to retain the latter in its raised position against the downward force of the compressed spring 26, and, upon reaching its raised position, piston 15 displaces valve member 39 to the condition wherein chamber 16 is in communication with the atmosphere. Then, the washing device is conditioned for future operation, with the spring 26 serving as an accumulator of energy to be employed in effecting the subsequent downward or pumping stroke of piston 15.

When it is desired to spray cleaning fluid against the windshield 23, knob 33 is manipulated to effect release of the latch 28 and piston 15 is then free to be driven downwardly by the loaded or compressed spring 26. Such downward movement of the piston 15 pumps the cleaning fluid previously drawn into chamber 17 out of the latter through passage 20, past check valve 25, and through pipe 21 for discharge at the nozzle 22 in the form of a cleaning spray. It is apparent that the spraying of the cleaning fluid in the manner described above is not dependent upon the existence of a vacuum or low pressure, for example, within the intake manifold of the associated engine, at the instant when it is desired to effect cleaning of the windshield, since the pumping stroke of piston 15 is effected by the energy previously stored-up or accumulated by spring 26. Following the discharge of cleaning fluid, valve member 39 is shifted by the piston 15, to the position wherein chamber 16 again communicates with pipe 44 so that, when a vacuum or low pressure is developed in pipe 44, the piston 15 is again moved upwardly to draw a new charge of cleaning fluid into chamber 17 and to again compress or load the spring 26. If repeated discharging of the cleaning fluid against windshield 23 is desired, latch 28 may be retained in its released position, so that, immediately upon the return of piston 15 to its raised position and the concurrent communication of chamber 16 with the atmosphere, piston 15 is again stroked downwardly by spring 26 to discharge the contents of chamber 17. Thus, until such time as latch 28 is returned or restored to its operative position for engagement with groove 29 of the piston, piston 15 will be repeatedly reciprocated within the cylinder 11, so long as a source of vacuum or low pressure is available to the pipe 44, thereby to effect the intermittent and repeated discharge of a spray of cleaning fluid from nozzle 22. But, in any event, it is to be noted that, following the raising of piston 15 and the compression of spring 26, at least a single discharge of cleaning fluid can be achieved even in the absence of an adequate supply or source of vacuum or low pressure, for example, as when the vehicle is being accelerated for the purpose of passing other vehicles or otherwise.

In the above described embodiment of the invention, it is apparent that at some time prior to the operation of the windshield washing device, a source of low pressure or vacuum must be available to the pipe 44 in order to effect initial filling of chamber 17 and compression of spring 26 by upward movement of the piston 15. However, Figs. 2, 3 and 4 illustrate an embodiment of the invention wherein such initial filling or charging of the pump cylinder can be effected manually and without reliance upon the existence of a low pressure or vacuum, for example, when it is desired to effect cleaning of the windshield prior to starting of the engine.

Figure 2:
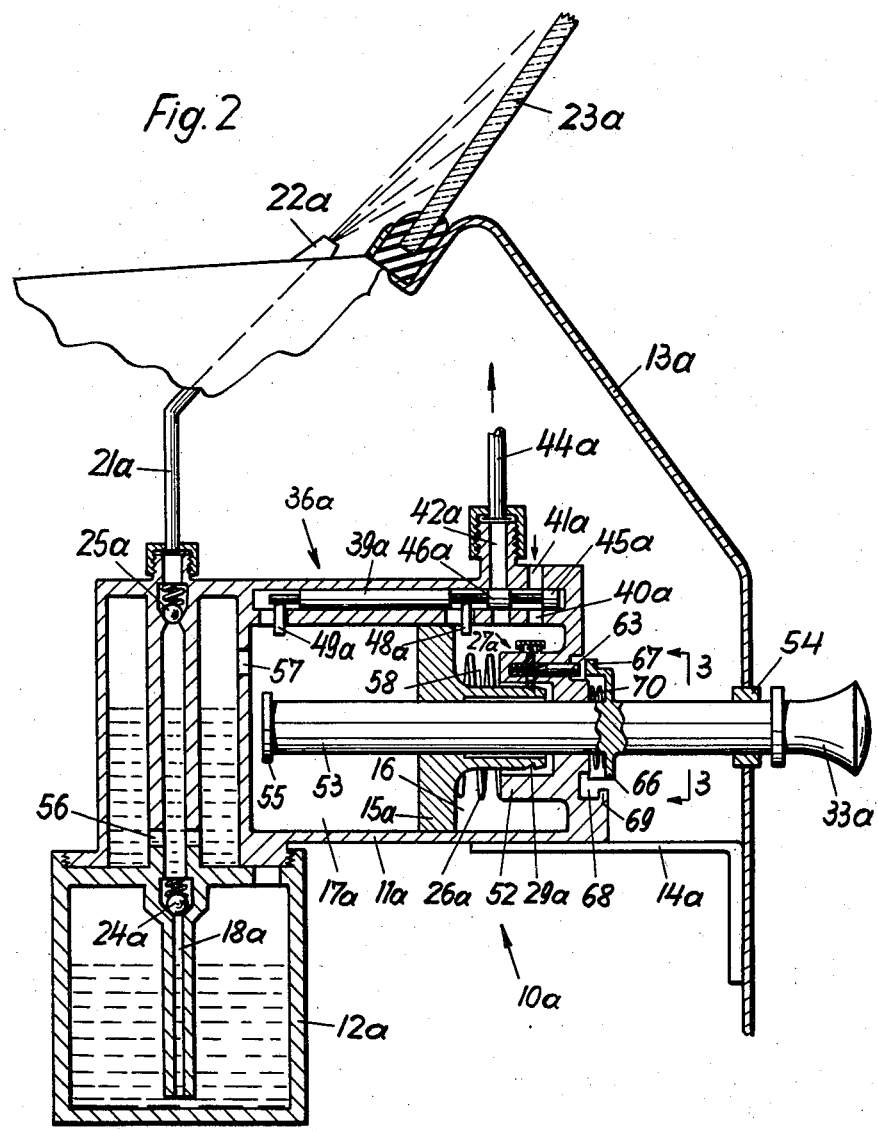
Fig. 2 is a vertical sectional view similar to Fig. 1 but showing another embodiment of the present invention.
Figure 3:
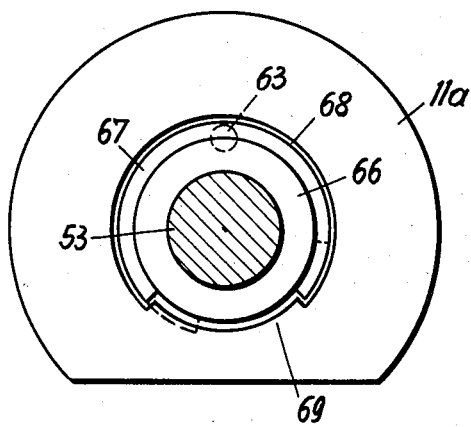
Fig. 3 is a detailed view, partly in section, and taken along the line 3—3 of Fig. 2.
Figure 4:
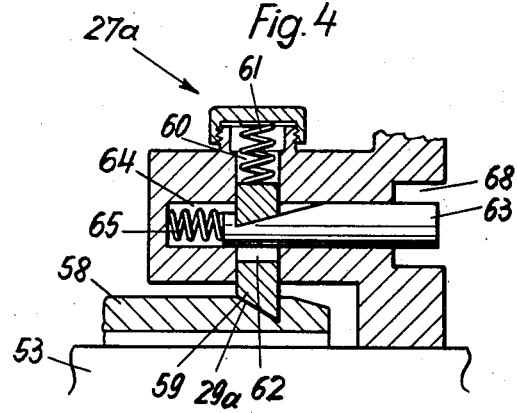
Fig. 4 is a fragmentary view, on an enlarged scale, of a portion of the structure shown in Fig. 2.

The windshield washing device illustrated in Figs. 2, 3 and 4 and generally identified by the reference numeral 10a is generally similar to that described above in connection with Fig. 1 and the corresponding parts thereof are identified by the same reference numerals with the letter "a" appended thereto. Device 10a includes a pump cylinder 11a and a tank 12a depending therefrom to contain a supply of cleaning fluid. The assembly of the pump cylinder and tank, as before, is mounted in back of the dashboard 13a by suitable brackets 14a. Unlike the arrangement of Fig. 1, the cylinder 11a of the windshield washing device 10a is preferably arranged with its axis extending substantially in the horizontal direction so that the piston 15a disposed in the cylinder reciprocates horizontally and divides the interior of the pump cylinder into driving and pumping chambers 16a and 17a, respectively, of oppositely varying volumes at the opposite sides of the piston.

The head of cylinder 11a, that is, the end thereof, disposed to the right in Fig. 2, is formed with a central opening having an annular collar 52 concentric therewith and extending axially into chamber 16a, and an operating rod 53 extends slidably and rotatably through the head of cylinder 11a and through piston 15a which is provided with a suitable axial bore for receiving the operating rod. Rod 53, at its outer end, extends slidably and rotatably through a suitable bushing 54 on the dashboard 13a and carries the actuating knob 33a. The inner end of operating rod 53 has a flange or enlarged head 55 thereon within chamber 17a to engage against the pump piston and thereby to prevent withdrawal of the operating rod from the pump piston. Thus, a lost motion connection is provided between rod 53 and piston 15a so that, when knob 33a is pulled to the right, as viewed in Fig. 2, piston 15a is also displaced in that direction to compress spring 26a and simultaneously to draw cleaning fluid from tank 12a through feed pipe 18a, past check valve 24a and through openings 56 and 57 into chamber 17a of the pump cylinder. It is apparent that the device 10a can be manually charged or conditioned for future operation by actuation of rod 53 so that it is not dependent upon the existence of a low pressure or vacuum in the intake manifold of the associated engine for this purpose.

As seen in Fig. 2, piston 15a is preferably formed at one side with a hollow boss 58 telescoping on rod 53 and having the retaining groove 29a extending circumferentially therearound. The boss 58 is externally dimensioned to fit into collar 52 when the pump piston is displaced toward the right, as viewed in Fig. 2, and the latch device, generally identified by the reference numeral 27a and illustrated in detail in Fig. 4, is preferably mounted in the collar 52. Latch device 27a includes a latch member 59 movable radially with respect to boss 58 in a suitable bore 60 of the collar 52 for engaging and disengaging the groove 29a. A spring 61 is preferably provided to act against latch member 59 in the direction urging the latter into groove 29a, and the latch member is formed with an opening 62 extending therethrough to slidably receive a wedge-shaped portion of a latch actuating member 63 which is slidable in a longitudinal bore 64 intersecting the bore 60. Thus, when latch actuating member 63 is moved to the left, as viewed in Fig. 4, the wedge-shaped portion thereof acts upon the latch member 59 to withdraw the latter from engagement with groove 29a, while displacement of member 63 in the opposite direction permits the latch member to project inwardly from collar 52 for engagement in groove 29a. A spring 65 is preferably provided in bore 64 to urge latch actuating member 63 in the direction permitting engagement of the latch member with the groove 29a.

In order to effect release of the latch device 27a from the piston 15a, a radial flange 66 is formed on operating rod 53 and is provided with an offset lip 67 along a substantial portion of the periphery thereof for engagement with the end of member 63 which extends into an annular groove 68 opening axially in the outer face of the head of cylinder 11a. Thus, when rod 53 is displaced to the left, from the position shown in Fig. 2, lip 67 bears against member 63 to displace the latter in the direction releasing latch member 59 from groove 29a of the piston. As seen in Figs. 2 and 3, a rim 69 is formed along a limited portion of groove 68 so that, after rod 53 has been displaced to the left, as viewed in Fig. 2, for the purpose of releasing latch device 27a, rod 53 and with it flange 66 and lip 67 can be angularly displaced, to the broken line position shown in Fig. 3, thereby to engage a portion of lip 67 in back of rim 69 so that the latter prevents return movement of rod 53 in the longitudinal direction and thereby maintains the latch device 27a in its released condition until the operating rod 53 is again angularly displaced so as to align the gap between the ends of lip 67 with the rim 69, as shown in full lines on Fig. 3. Preferably, a spring 70 (Fig. 2) is disposed between flange 66 and the head of cylinder 11a for yieldably urging rod 53 in the direction removing lip 67 from contact with the outer end of latch actuating member 63.

The device illustrated in Figs. 2, 3 and 4 of the drawings operates as follows:

When it is desired to effect cleaning of the windshield 23a prior to starting of the associated engine, knob 33a is pulled to the right, as viewed in Fig. 2, so that the head 55 on rod 53 engages the pump piston and displaces the latter in the direction compressing spring 26a and drawing cleaning fluid from the tank 12a into chamber 17a. When spring 26a has been compressed and a charge of cleaning fluid has been drawn into chamber 17a, latch device 27a holds piston 15a in its charged position against the force exerted by spring 26a, and the valve assembly 36a, which corresponds and is substantially similar to the valve assembly 36 described in connection with the embodiment of Fig. 1, places chamber 16a in communication with the atmosphere through the passage 40a. The device 10a is then conditioned for the discharge of cleaning fluid upon the release of latch device 27a. As previously mentioned, such release of the latch device is effected by pushing the knob 33a toward the dashboard 13a until lip 67 acts against the latch actuating member 63 to release the latch member 59. Such release of the latch member frees piston 15a so that the compressed spring 26 can move the piston toward the left, as viewed in Fig. 2, whereby the piston pumps the cleaning fluid from chamber 17a, through openings 57 and 56, past check valve 25a and through discharge pipe 21a for emission from nozzle 22a in the form of a cleaning spray. It is apparent that the above described manual operation of the device 10a can be repeated, at will, merely by reciprocating operating rod 53, and that such repeated operation of the device is not dependent upon the existence of a low pressure or vacuum in the pipe 44a leading to the intake manifold of the associated engine.

Assuming that the piston 15a has completed a pumping stroke, as soon as the associated automobile engine has been placed in operation, thereby to provide a low pressure or vacuum in pipe 44a, valve assembly 36a will automatically function, in the manner described above in connection with valve assembly 36, to displace piston 15a in the direction compressing spring 26a and drawing cleaning fluid into chamber 17a. If rod 53 is disposed as shown in Fig. 2, so that the lip 67 thereon is out of contact with actuating member 63 of the latch device, the latch device 27a will be operative to retain piston 15a in the position shown in Fig. 2 until such time as the rod 53 is displaced toward the left, as viewed in Fig. 2, to release the latch device, whereupon the cleaning fluid in chamber 17a will be discharged even though there may be no low pressure or vacuum available at the instant when the latch device is released. However, if rod 53 is pushed toward the left, as viewed in Fig. 2, and then angularly displaced to the broken line position of Fig. 3, so as to engage lip 67 in back of rim 69, the latch device 27a will be retained in its released condition and piston 15a will be repeated reciprocated within cylinder 11a so long as vacuum or low pressure is available to pipe 44a, thereby to effect the repeated and intermittent discharge of a spray of cleaning fluid from nozzle 22a.

While specific embodiments of the present invention have been described in detail and illustrated in the accompanying drawings, merely by way of example, it is to be understood that the present invention is not limited to such specific embodiments, and that various changes and modifications may be effected therein without departing from the scope or spirit of the invention as defined in the appended claims.

What is claimed is:

1. In a windshield washing device; the combination of a cylinder having a piston reciprocatable therein and dividing the interior of said cylinder into a pumping chamber and a driving chamber at opposite sides of said piston, means for connecting said pumping chamber between a supply of cleaning fluid and a discharge for the latter so that stroking of said piston in one direction to increase the volume of said pumping chambers serves to draw cleaning fluid into the latter while stroking of the piston in the other direction pumps cleaning fluid out of said pumping chamber and through said discharge, means for selectively communicating said driving chamber with sources of relatively low pressure and high pressure, respectively, yieldable means continuously urging said piston in said other direction so that, when said driving chamber communicates with a source of relatively low pressure to stroke said piston in said one direction, said yieldable means accumulates energy for subsequent stroking of said piston in said other direction, and a releasable latch mounted for engagement with said piston for retaining same at the position occupied by the latter at the conclusion of said stroke in said one direction so that, upon the release of said latch and the communication of said driving chamber with a source of relatively high pressure, said piston is driven by said yieldable means to pump cleaning fluid from said pumping chamber.

2. In a windshield washing device; the combination according to claim 1, further comprising keeper means movable with said piston to receive said latch, and actuating means for selectively engaging and disengaging said latch in said keeper means.

3. In a windshield washing device, the combination according to claim 1, wherein said means for selectively communicating said driving chamber with sources of relatively low pressure and high pressure, respectively, includes conduits extending from said driving chamber for connection to sources of relatively low pressure and high pressure, respectively, and valve means operative alternatively to open the conduit to the source of low pressure while closing the other of said conduits and to open said other conduit while closing said conduit to the source of low pressure.

4. In a windshield washing device; the combination according to claim 3, including valve actuating means operative to condition said valve means for closing said other conduit to the source of low pressure at the end of the stroke of said piston in said other direction and during the stroke of said piston in said one direction, and to condition said valve means for opening said other conduit and closing said conduit to the source of low pressure at the end of said stroke in said one direction and during the stroke in said other direction.

5. In a windshield washing device; the combination according to claim 1, further comprising manually actuated means for stroking said piston in said one direction whereby cleaning fluid can be drawn into said pumping chamber and energy accumulated in said yieldable means independent of the existence of a source of low pressure for effecting stroking of the piston in said one direction.

6. In a windshield washing device; the combination according to claim 1, further comprising means for holding said latch in the released condition so that said piston can repeatedly reciprocate in said cylinder thereby to effect the intermittent and repeated discharge of cleaning fluid.

7. In a windshield washing device; the combination of a cylinder having a piston reciprocatable therein and dividing the interior of said cylinder into a pumping chamber and a driving chamber at opposite sides of said piston, means for connecting said pumping chamber between a supply of a cleaning fluid and a discharge for the latter so that stroking of said piston in one direction to increase the volume of said pumping chamber serves to draw cleaning fluid into the latter while stroking of the piston in the other direction pumps cleaning fluid out of said pumping chamber and through said discharge, conduits extending from said driving chamber for connection to sources of relatively low pressure and high pressure, respectively, valve means operative alternatively to open the conduit to the source of low pressure while closing the other of said conduits and to open said other conduit while closing said conduit to the source of low pressure, valve actuating means operative to condition said valve means for closing said other conduit to the source of low pressure at the end of the stroke of said piston in said other direction and during the stroke of said piston in said one direction, and to condition said valve means for opening said other conduit and closing said conduit to the source of low pressure at the end of said stroke in said one direction and during the stroke in said other direction, said valve actuating means being mounted for engagement by said piston and operative in response to stroking of the latter, yieldable means continuously urging said piston in said other direction so that, when said driving chamber communicates with a source of relatively low pressure to stroke said piston in said one direction, said yieldable means accumulates energy for subsequent stroking of said piston in said other direction, and a releasable latch mounted for engagement with said piston for retaining same at the position occupied by the latter at the conclusion of said stroke in said one direction so that, upon the release of said latch and the communication of said driving chamber with a source of relatively high pressure, said piston is driven by said yieldable means to pump cleaning fluid from said pumping chamber.

8. In a windshield washing device; the combination according to claim 7, wherein said retaining means includes a radially movable latch member, said piston having a circumferential groove in a portion thereof to receive said latch member, and axially movable means acting on said latch member to effect radial movement of the latter into and out of said groove; and further comprising resilient means acting on the last mentioned means to urge the latter in the direction moving the latch member radially into said groove, and latch releasing means on said operating rod engageable with said last mentioned means after a predetermined displacement of said rod in said other direction and operative to move said last mentioned means in the direction radially disengaging said latch member from said groove.

9. In a windshield washing device; the combination according to claim 8, wherein said operating rod is angularly, as well as axially, movable, and further comprising a fixed abutment adjacent said operating rod and normally angularly spaced from said latch releasing means on the latter, said fixed abutment being operative, when said rod is angularly displaced to align said latch releasing means with the abutment, to engage said latch releasing means and thereby to hold said rod against axial movement in said one direction after engagement of said latch releasing means with said last mentioned means so that the latch member is held out of engagement with said groove to permit repeated stroking of said piston.

10. In a windshield washing device; the combination according to claim 9, wherein said valve means includes a valve housing adjacent said cylinder and laterally traversed by said conduits, and a slide valve member movable in said housing substantially parallel to the axis of said cylinder to selectively open and close said conduits, and wherein said valve actuating means includes lateral extensions projecting from said slide valve member and into said cylinder at opposite sides of the piston, said extensions being spaced apart by a distance greater than the axial dimension of said piston and being engageable by the latter to provide a lost-motion connection between said piston and said slide valve member.

11. In a windshield washing device; the combination according to claim 7, further comprising means on said operating rod operative to release said latch after a predetermined displacement of said rod in said other direction.

12. In a windshield washing device; the combination according to claim 11, further comprising means for holding said operating rod against axial displacement in the position of said rod effecting release of said latch.

13. In a windshield washing device; the combination of a cylinder having a piston reciprocatable therein and dividing the interior of said cylinder into a pumping chamber and a driving chamber at opposite sides of said piston, means for connecting said pumping chamber between a supply of cleaning fluid and a discharge for the latter so that stroking of said piston in one direction to increase the volume of said pumping chamber serves to draw cleaning fluid into the latter while stroking of the piston in the other direction pumps cleaning fluid out of said pumping chamber and through said discharge, means for selectively communicating said driving chamber with sources of relatively low pressure and high pressure, respectively, yieldable means continuously urging said piston in said other direction so that, when said driving chamber communicates with a source of relatively low pressure to stroke said piston in said one direction, said yieldable means accumulates energy for subsequent stroking of said piston in said other direction, a latch member mounted for engagement with said piston for retaining same at the position occupied by the latter at the conclusion of said stroke in said one direction so that, upon the releases of said latch member and the communication of said driving chamber with a source of relatively high pressure, said piston is driven by said yieldable means to pump cleaning fluid from said pumping chamber, means on said cylinder defining a radial guide for said latch member so that the latter is movable between an operative position projecting into said cylinder and an inoperative position withdrawn from said cylinder, said piston having a circumferental groove to receive said latch member when the latter is in the operative position thereof and said piston is disposed at the end of its stroke in said one direction; and further comprising latch actuating means including resilient means urging said latch member to said operative position of the latter, an actuating knob, support means for said knob threadably receiving the latter so that rotation of the knob produces axial movement of the latter, and transmission means between said knob and said latch member operative to convert axial movement of said knob into movement of said latch member between said operative and inoperative positions of the latter.

14. In a windshield washing device; the combination of a cylinder having a piston reciprocatable therein and dividing the interior of said cylinder into a pumping chamber and a driving chamber at opposite sides of said piston, means for connecting said pumping chamber between a supply of cleaning fluid and a discharge for the latter so that stroking of said piston in one direction to increase the volume of said pumping chamber serves to draw cleaning fluid into the latter while stroking of the piston in the other direction pumps cleaning fluid out of said pumping chamber and through said discharge, means for selectively communicating said driving chamber with sources of relatively low pressure and high pressure, respectively, yieldable means continuously urging said piston in said other direction so that, when said driving chamber communicates with a source of relatively low pressure to stroke said piston in said one direction, said yieldable means accumulates energy for subsequent stroking of said piston in said other direction, a releasable latch mounted for engagement with said piston for retaining same at the piston occupied by the latter at the conclusion of said stroke in said one direction so that, upon the release of said latch and the communication of said driving chamber with a source of relatively high pressure, said piston is driven by said yieldable means to pump cleaning fluid from said pumping chamber, an operating rod extending axially and slidably through said piston and projecting at one end from said cylinder, and means on the other end of said rod within said pumping chamber to prevent removal of said rod from said piston so that axial displacement of said rod in said one direction carries along said piston to draw cleaning fluid into said pumping chamber and to accumulate energy in said yieldable means independent of the existence of a source of low pressure at the time of such displacement of the rod.

References Cited in the file of this patent

UNITED STATES PATENTS

| 1,354,557 | Huffman | Oct. 5, 1920 |
| 1,723,909 | Alvey | Aug. 6, 1929 |
| 2,688,514 | Oishei et al. | Sept. 7, 1954 |

FOREIGN PATENTS

| 211,963 | Great Britain | Feb. 29, 1924 |